Jan. 20, 1942.  H. W. BRENTZ  2,270,696
APPARATUS FOR REGULATING THE DISCHARGE OF MATERIAL FROM A SEPARATOR
Filed Dec. 16, 1938  4 Sheets-Sheet 1
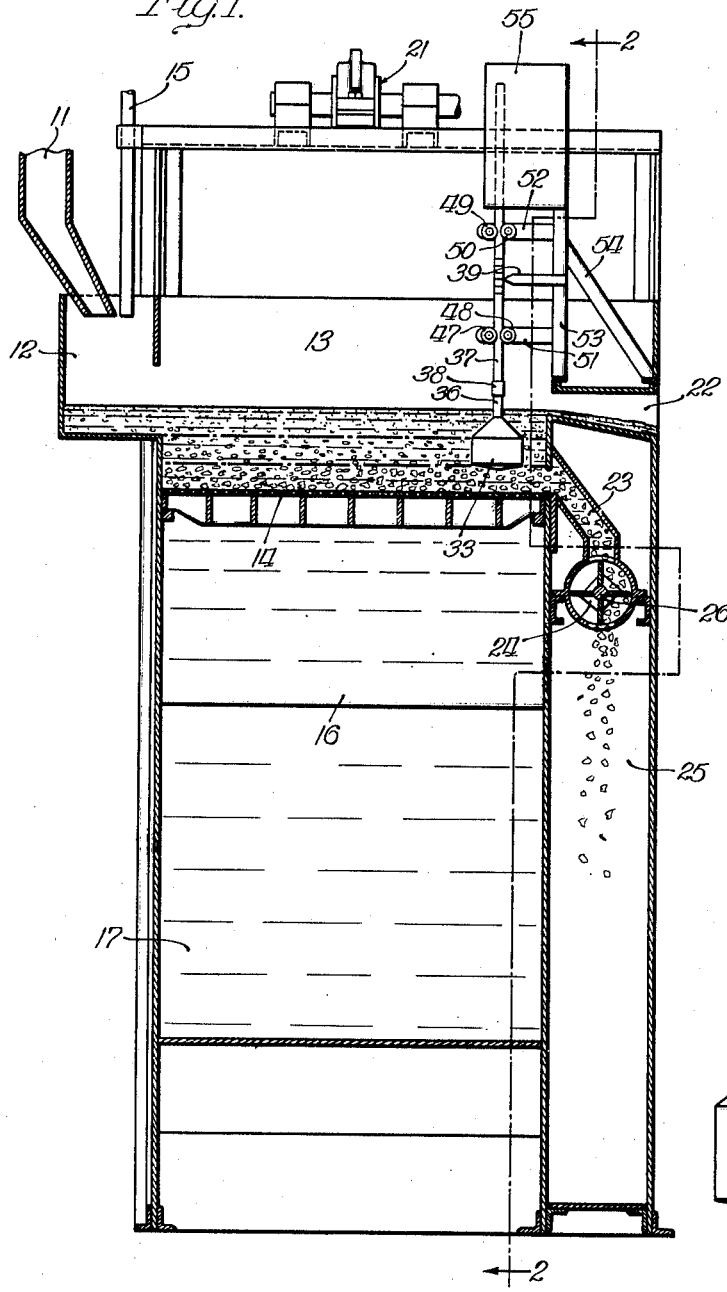
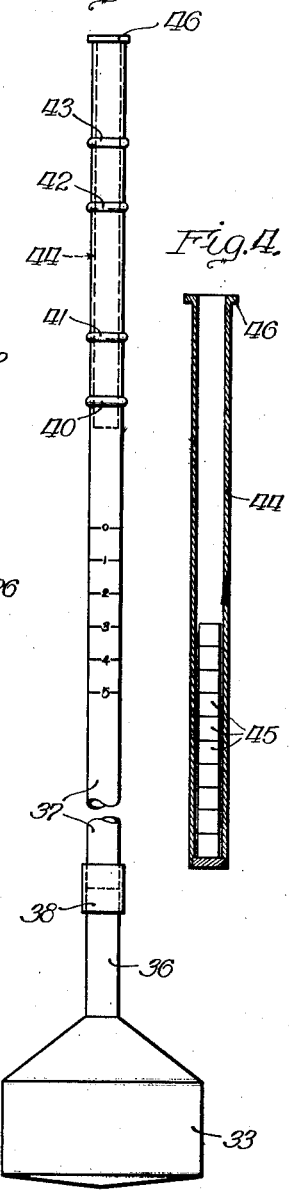
INVENTOR.
Harry W. Brentz
BY Richardson & Auer
ATTORNEYS.

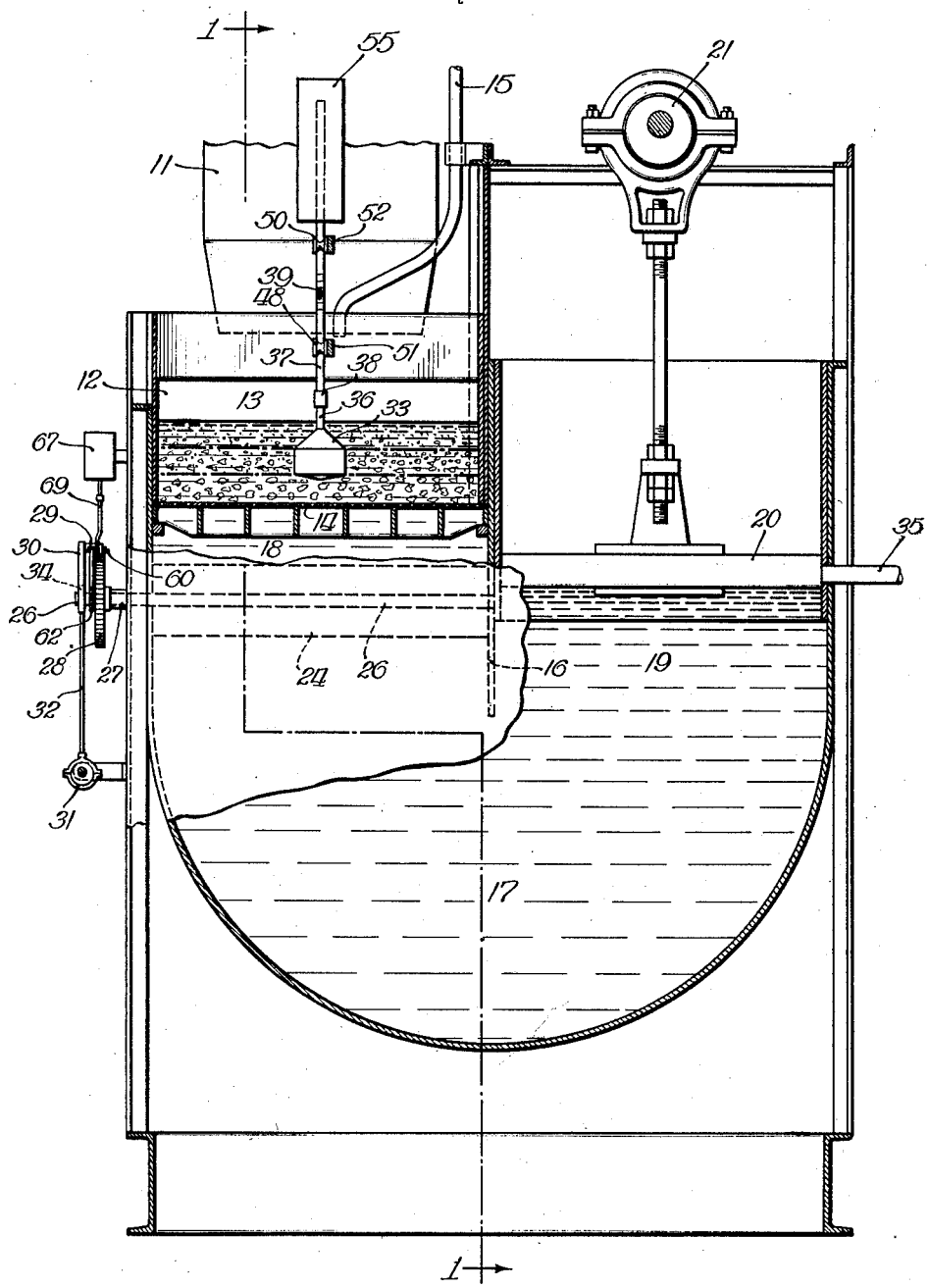

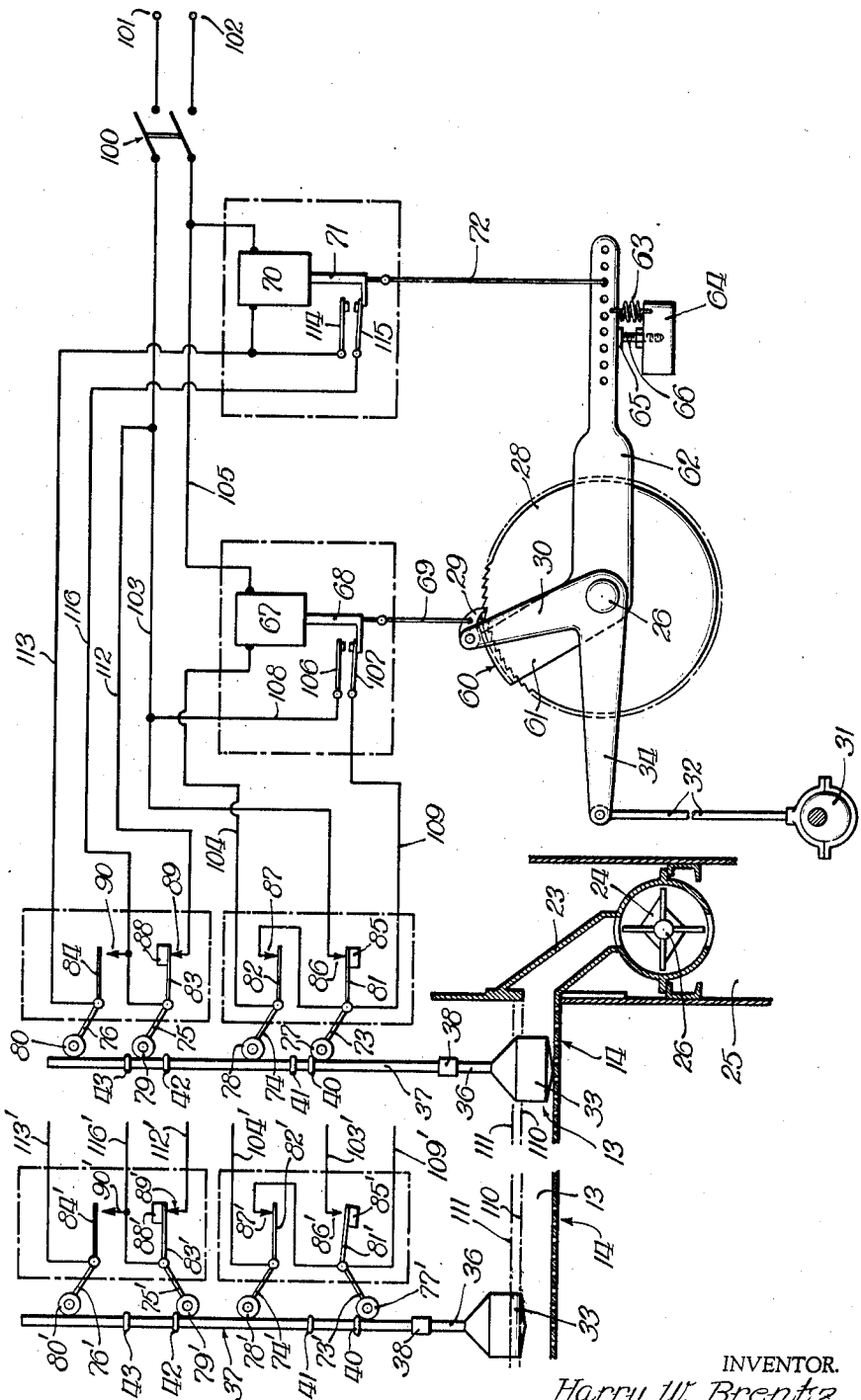

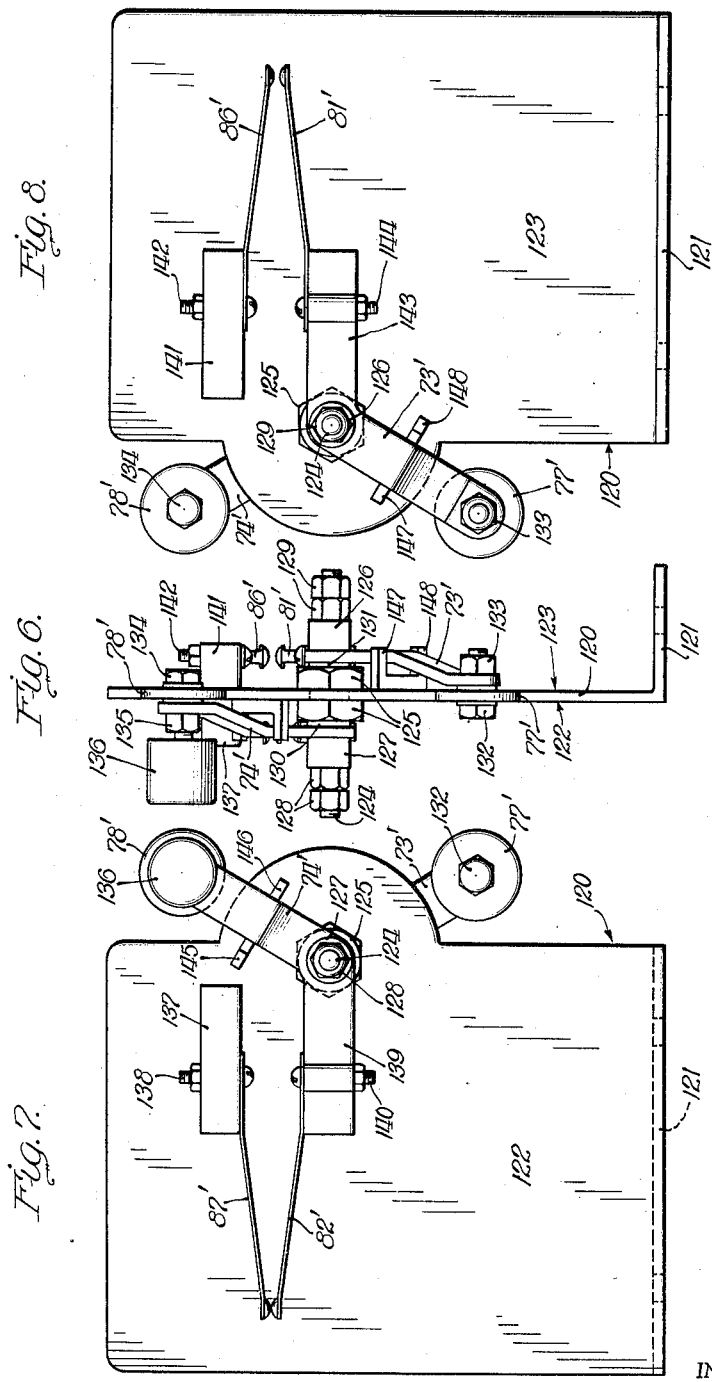

Patented Jan. 20, 1942

2,270,696

UNITED STATES PATENT OFFICE 2,270,696

APPARATUS FOR REGULATING THE DISCHARGE OF MATERIAL FROM A SEPARATOR

Harry W. Brentz, Pittsburg, Kans.

Application December 16, 1938, Serial No. 246,161

8 Claims. (Cl. 209—496)

This invention relates to apparatus for separating materials, and is particularly concerned with new means for controlling the operation of such apparatus by regulating and governing the accumulation of material therein and the discharge or removal of separated material therefrom.

The device commonly known as a jig may be mentioned as an example of an apparatus to which the present invention may be applied. The separation of materials, for instance, minerals, is accomplished in such a jig by feeding the raw material onto a suitable bed plate forming the floor or bottom of a separating compartment and imparting thereto upward impulses of air, water or other medium to obtain a stratification due to the differences in specific gravity of the particles of the material to be separated. The heavier particles are thus concentrated at the bottom of the bed, and the lighter particles stratify therein in successive upward layers. Depending on the type of material to be treated, and on the general procedure decided upon, one or more of the layers or strata of segregated particles may be discharged from the device and collected for use, while another layer or layers may be rejected as refuse or re-circulated for further treatment. This discharge or removal of stratified material may be carried out in a continuous operation by means of chutes, gates, conveyors, or the like, or, as is usual, by a combination of such devices.

Considerable difficulties have arisen in controlling the operation of such machinery, due to the varying properties of the materials which are to be subjected to the separating treatment. For example, the time required for proper stratification may vary considerably during different phases of a continuous process, even in case of a run of material of the same general class and origin, due to variable amounts of admixtures occurring sectionally in the feed in unexpected and unpredictable concentration. Accordingly, the stratification and the yield of such an apparatus, when operated in accordance with orthodox means, may be erratic and may fluctuate from congestion within the separating compartment to lack of material in one or another or in all strata. We are thus dealing with the treatment of a heterogeneous material containing different substances in heterogeneous or nonuniform admixtures, and are faced with the problem of making the process as uniform as possible to secure thereby a uniform product. The solution for this problem is exceedingly difficult. In apparatus known heretofore, it is necessary to resort to constant supervision for the purpose of carrying out varying adjustments of the control mechanisms according to any condition that may arise, so as to obtain at least an approximately proper coordination of the devices governing the feed, stratification and the discharge which alone can secure a somewhat uniform product. However, the results are uncertain, even with the best supervision and control that can be rendered in this more or less empirical and haphazard fashion, and the procedure is accordingly uneconomical, inefficient, and frequently quite wasteful.

The method and means of control disclosed herein overcome these and other difficulties. It is believed that the present disclosure constitutes the first successful arrangement capable of governing the operation of a separating apparatus automatically, in such a way that all devices required to coordinate the feed with the rate of stratification and rate of discharge are properly actuated to secure an even and constantly uniform product, and to use the machinery efficiently and to its fullest capacity. The control made in accordance with this invention may be employed in connection with any type of separating apparatus, cell or jig using mechanically driven devices, such as rotating wheels, gates, or the like for removing the selected portion of the bed material.

The salient objects and features of the invention may be briefly stated as follows:

One object is concerned with the provision of means for visually indicating, at any time, the depth of a critical layer of stratified material in the bed compartment of the separating apparatus, for example, the depth of the layer to be rejected, with reference to the bed plate or bottom of the bed compartment.

Another object is concerned with the provision of a material separating apparatus wherein the actuation of mechanically driven devices for removing separated material is automatically governed by electrical control means so as to correlate the separating functions with the discharge functions in such a manner as to secure uniform continuous operation and to obtain a constantly uniform product.

A further object is realized by the provision of means for inhibiting the operation of the material rejection or removal devices until the material is properly stratified in the bed compartment and has attained a predetermined depth therein, and for then initiating and maintaining the actuation of said devices at a predetermined normal speed to obtain a uniform and predetermined rate of continuous operation and discharge.

Still another object resides in the provision of means for accelerating the rate of discharge or removal of separated material to compensate for accelerated accumulation thereof in the separating compartment, and vice versa, for slowing down the rate of discharge to compensate for a lagging in the rate with which the material is stratified and massed in the bed compartment.

These and other objects of the invention, which have not yet been specifically mentioned above, including, for example, the structure of a new control switch and adjustable float means, will be described in detail with reference to the accompanying drawings, wherein:

Figs. 1 and 2 show sections through a well known type of separating cell or jig which is equipped with the novel control arrangement, these sections being taken approximately along the lines 1—1 (Fig. 2) and 2—2 (Fig. 1), with parts which are not essential for the invention merely indicated or omitted entirely, and other parts broken away, indicated fragmentarily, or in plane view so as to support the explanations;

Figs. 3 and 4 are views of one embodiment of a new float structure forming a detail in the apparatus;

Fig. 5 represents one embodiment of the entire arrangement more or less diagrammatically, showing parts of a jig cell, certain mechanical control means thereof, and the electrical equipment which is responsive to varying conditions of stratification in the bed compartment, and in turn governs the actuation of the mechanical control means to regulate the discharge of the material;

Fig. 6 illustrates the end view of a new control switch, for supervising the stratification within the bed compartment and for governing the operation of the electrical and also the mechanical control equipment;

Fig. 7 is a side view of the switch shown in Fig. 6, as seen from the left;

Fig. 8 is another side view of the switch shown in Fig. 6, as seen from the right; and Fig. 9 is a fragmentary diagrammatic showing of the new control switch in relation to the float during normal operating conditions.

The invention is described herein in connectio with the well known type of jig or separating cell wherein the separation is accomplished by means of a pulsating column of liquid, for example, water, and wherein the removal of the bed material is carried out by means of a rotating wheel feeding into a compartment from which the material is removed by a suitable elevator or conveyor. It will be understood, of course, that this specific disclosure is merely made for the purpose of supplying a concrete example showing how the invention may be used in practice, without, however, intending to indicate any undue limitations. The invention may be used to equal advantage in other types of separating apparatus and may have a wide application in industries apart from the specific use described herein.

Like parts are designated in the drawings by like reference numerals. Structural details or functions which may safely be assumed to be well known are described in the following only to the extent required to support the understanding of the invention.

Referring now to Figs. 1 and 2, the material to be jigged, that is, to be separated by stratification, is supplied to the apparatus over the chute 11 which may be equipped, if desired, with a suitable adjustable supply gate. This gate is omitted in order to simplify the drawings. It may be provided at any suitable place in the supply line, and may be subject to automatic control in a manner which will be presently described more in detail. The material delivered through the chute 11 is deposited in the feed compartment 12 from which it is transported into the separating compartment or chamber 13 and onto the perforated bed plate 14 thereof. Water may be supplied to the feed compartment through the pipe 15. The drawings show a simple pipe bent at an angle (Fig. 2) so as to deliver the water centrally of the feed, but it is understood that this showing is merely for explanatory purposes. Any known and suitable water supply device may be employed, including single or multi-jets in any distribution or arrangement that may be desired or required. The plate 16 separates the tank compartment 17 into a frontal section 18 lying directly below the perforated bed plate 14 and a pump section 19 situated below the piston or plunger 20 which is actuated by eccentric drive 21. Water may also be supplied to the pump or plunger section of the device through the pipe 35 indicated in Fig. 2, or through any other similar or desired and suitably located device. The actuation of the plunger 20 produces pulsations driving a column of water in impulses against and through the perforated bed plate 13 and through the material thereon. This action is assited by the water flowing from the pipe 15 into the feed box 12 and moves the material gradually toward the overflow 22 which may be equipped with a suitable lip or chute. The overflow may also connect with another jig, or with a conveyor or the like, depending on the material subjected to the treatment, or on the results desired, or on the product which reaches the overflow. The material in the separating compartment 13 stratifies due to the agitation by the pulsating column of water and by the water supplied from the pipe 15 to the feed box 12, the stratification beginning near the feed box (at the left of drawing Fig. 1) because the particles which are lifted with each impulse of the liquid column settle according to their weight, the heavier particles gradually massing on the bed plate 14 and the lighter particles accumulating in stratified layers upwardly and substantially paralleling the bed plate.

After stratification has been accomplished as noted above, it may be desired to remove and reject either the heavier product massed at the bottom of the bed, or to save this product and reject the lighter particles collected from the overflow 22. The correct procedure including, if desired, re-circulation of one or the other product, or additional treatment of another character, will always depend on and will be decided by the nature and type of material subjected to the treatment. For the purpose of description, it is assumed that the product accumulating at the bottom of the bed compartment, consisting of heavy pieces of material, is to be removed and that the removal is to be automatically controlled. Stating this object in other terms, it may be said that the massing of the heavy material in the bed compartment is to furnish the criterion for governing the operation of the apparatus. The bottom layer advances through the chute section 23 onto the rotatable rejection wheel 24. This wheel, upon rotating, discharges the material into the elevator compartment 25 for removal by means of a suitable elevator or conveyor. The rejection wheel 24 is mounted on a shaft 26, part of which protrudes to the outside, carrying a bushing 27 and a ratchet wheel 28 as indicated in Fig. 2, in side view, and in the lower right hand portion of Fig. 5, in end view. The ratchet 28, and with it the rejection wheel 24, may be actuated in a step-by-step manner by means of a pawl 29 carried on a doublearmed crank arm 30/34, which is pivoted on the shaft 26 and is oscillated by an eccentric drive 31 through the medium of the rod 32.

It will be seen from the foregoing explanations that the speed of discharge of the material into the elevator compartment 25 and, therefore, the speed of withdrawal of stratified material from the bed compartment 13 are direct functions of and in proportion to the speed of rotation of the rejection wheel 24. This speed can be kept uniform by a uniform rotation of the eccentric drive 31 and consequently, uniform advance of the ratchet 28. On the other hand the speed with which the material accumulates, or rather the speed with which it stratifies in the bed compartment 13, is dependent on the properties of the material and on many other factors which are non-uniform and are, for the purpose of the treatment, unpredictable and exceedingly difficult to control, as intimated previously. It may therefore happen, in the absence of any particular control means, that the accumulation of stratified material within the bed compartment varies within wide limits, producing conditions of either congestion or lagging, which are inimical to the efficient working of the apparatus and prevent the output of a uniform product in a continuous and substantially uniform process. The present invention coordinates these conflicting factors by a combination of mechanical and electrical control means which will now be described in detail.

In order to secure a means which indicates the condition of stratification within the bed compartment at any moment, and which can be used for translating these conditions into suitable coordinating control operations, I have provided a float 33 which is disposed in the bed compartment as shown in the drawings. This float, which is illustrated in detail in Figs. 3 and 4, may be a freely floating water-tight body and is weighed to simulate a piece of material of the same weight as the lightest piece to be removed through the chute 23. The float comprises the float body 33 and the stem 36 which is connected to the round stem 37 by means of the water-tight sleeve 38. The float body itself can thus be easily removed, for example, for repair or adjustment, or for replacement by another desired float body that may be required to satisfy any given condition. A suitable section of the stem 37 is marked or calibrated for cooperation with a pointer 39 (Figs. 1 and 2) to indicate the thickness of the critical layer of bed material with reference to the bed plate.

Disposed on the stem 37 are split control rings 40—41 and 42—43, the inside diameter of which may be slightly smaller than the outside diameter of the stem, to provide for a tight fit. If it is desired to move any one of these rings so as to place it in different position on the stem, which may be required for any given operating conditions, the corresponding ring which is made of springy material is spread and slipped along the stem until it is disposed in the desired position. The correct positions of these rings are determined by various operating factors, such, for example, as the desired depth of the bed of reject material and by the amount of pulsation necessary for proper stratification in the cell in which the float is installed. These control rings are provided for coaction with certain switching means which may be disposed in a casing such as indicated in Figs. 1 and 2 at 55. The contacts and the circuits controlled thereby are illustrated in Fig. 5.

Various operating conditions may require a change in the weight of the float. The tubular insert 44 carrying exchangeable and removable weights 45 shown in Fig. 4, is provided for this purpose. The insert is placed in the upper portion of the stem 37 and is equipped with a collar 46 for easy removal from the stem.

If desired, the float body 33 may also be made of a solid piece of a suitable metal or other substance, so as to withstand the force of continual impact of material against its surface without suffering any damage. The metal or other substance for the float body should be chosen so that its mass simulates a piece of material to be rejected, as already explained in connection with the float shown in the drawings. Such a solid float body may also receive any desired shape and may be attached to the stem by a simple threaded joint. The change in the weight of the float may again be adjusted by means of weights such as the weights 45 shown within the tubular insert 44.

The float is placed within the bed compartment and, as shown in Figs. 1 and 2, is held vertically movable and angularly rotatable by means of guide rollers 47—48 and 49—50 carried on brackets, such as 51 and 52, which are in turn suitably mounted on the carrier frame including the members 53 and 54.

The casing 55 contains the switching means including movable and fixed contacts. These contacts may simply be mounted on a suitable base plate or the like; the actuating portions thereof may be made in the form of rollers disposed in path of the control rings 40—43 on the float stem (Fig. 3) in a definite predetermined relation. Thus it may be noted at this point that there is provided a pair of contacts for coaction with the pair of control rings 40—41, for governing the starting and stopping of the discharge (rejection wheel 24), and one pair of contacts for coaction with the control rings 42—43 for governing the acceleration and deceleration of the discharge, all according to the conditions of stratification prevailing at any moment within the bed material compartment and indicated by the position of the control rings on the float stem relative to the contacts. Additional contact means, which have not been shown in the drawings, may be provided for controlling a gate disposed in the supply chute 11, if desired.

Assuming that the apparatus is empty and is to be started for operation, there will be no actuation of the rejection wheel until a predetermined depth of the material has been reached in the bed material compartment. At this moment certain contacts are operated by one of the control rings 40—41 to start the normal rotation of the rejection wheel 24. If this normal predetermined depth of stratification is maintained, the rotation of the rejection wheel will continue uniformly, furnishing a uniform discharge. The condition will conform to a coordination of feed, stratification, and removal of material. However, should the stratification proceed faster than the removal of the material, then one of the control rings 42—43 will actuate another pair of contacts and will thereby cause acceleration of the rejection wheel to accelerate the discharge. If the material continues to accumlate in the bed material compartment, additional contact means may be provided, as noted previously, for controlling the supply gate in the chute 11 or in the supply line in a similar manner. The operation will be presently described in detail; however, before entering a discussion of a cycle of operation, we will complete the description of the mechanical control means.

Referring particularly to the mechanical control means, as shown on the left side of Fig. 2, and to the end view thereof shown in the lower right hand portion of Fig. 5, it will be remembered that the eccentric drive 31 reciprocates the rod 32, thereby angularly oscillating the double-armed 30/34 which is pivoted on the shaft 26. On this shaft is also mounted the rejection wheel 24. Keyed to the shaft 26 is the ratchet wheel 28. The arm 30 of the crank 30/34 carries the pawl 29 which is provided with a suitable detent. Accordingly, when the eccentric drive 31 is rotated, it will actuate the double-armed crank 30/34, the pawl 29 will engage the teeth of the ratchet 28, and the shaft 26 will thus be rotated and will rotate the rejection wheel 24 for the removal of the material into the elevator compartment 25. The maximum angular movement of the double-armed crank 30/34 with respect to the ratchet 28 is arranged so that the pawl 29 can move the ratchet 28, at the most, by a predetermined number of teeth, for example, four teeth.

In order to provide for an adjustment of the pawl movement with respect to the ratchet, a shield 60 is attached to or made part of a double-armed lever having the arms 61/62. If this lever is in the normal position shown in Fig. 5, the pawl 29, incident to the actuation of the double-armed crank 30/34, will engage a predetermined minimum number of teeth, for example, only one tooth. However, if the lever 61/62 is rotated and displaced in counterclockwise direction, as seen in Fig. 5, the shield 60 will be removed from its normal position under the pawl 29 and the pawl will then be able to engage a predetermined maximum number of teeth and advance the ratchet accordingly. The arm 62 of the shield control lever is held in normal position by means of a spring 63, one end of which is secured to the arm, with its other end attached to the stationary bracket 64. The arm 62 is provided with a stop 65 acting against an adjustable stop 66 on the bratcket 64 for variably adjusting the normal position of the shield 60 with respect to the pawl 29.

The electrical control includes a solenoid 67 or the like, provided with a plunger 68 which is connected with the pawl 29 by means of a flexible coupling 69. So long as the solenoid 67 is deenergized, the pawl 29 will be in operative position, as shown in Fig. 5, and, responsive to the actuation of the eccentric drive 31, will be able to advance the ratchet wheel 28 and with it the rejection wheel 24. If the solenoid 67 is energized, the plunger 68 will be attracted and the flexible coupling will have lifted the pawl 29 and will prevent engagement of the pawl with the teeth of the ratchet wheel 28. The rotation of the eccentric drive 31 and consequent rocking of the double-armed crank 30/34 is then without effect. The ratchet wheel 28, and with it the rejection wheel 24, will stand still, and there will be no removal of material into the elevator compartment 25.

Another solenoid 70 is provided for the adjustment of the shield 60 with respect to the pawl 29. This solenoid is also equipped with the usual plunger 71 which is connected by means of the flexible coupling 72 with the shield-actuating arm 62. If the solenoid 70 is in its normal or deenergized position as shown in Fig. 5, the shield 60 will be inserted under the pawl 29 and the pawl will be able to engage only a predetermined minimum number of teeth, for example, only one tooth, depending on the setting of the stops 65—66, as previously mentioned. However, energization of the solenoid 70 causes attraction of plunger 71 and through the flexible coupling 72 the lifting of the arm 62 and consequent counterclockwise removal of the shield 60 from cooperation with the pawl 29. The pawl is then able to engage a maximum number of teeth. The arm 62 is provided with a number of means, for example, with holes, for the variable attachment of the flexible coupling 72. The amount of angular displacement of the shield actuating lever 61/62 and, therefore, displacement of the shield 60 relative to the pawl 29, is thus also adjustable.

The first mentioned control for the pawl 29 by means of the solenoid 67 determines and controls the stopping and starting of the rejection wheel rotation, and therefore the normal continuous discharge or removal of material, while the second noted control involving the solenoid 70 and the shield 60 on the lever arm 61 takes care of the acceleration or deceleration of the discharge to compensate for an accumulation of material or stratification deviating from the normal condition.

The lower pair of control rings 40—41, provided on the float stem, cooperates with the contact-actuating levers 73—74, and the upper pair of control rings 42—43 cooperates with the contact-actuating levers 75—76. Each of these levers is equipped with a suitable roller, as indicated by the numerals 77, 78, 79 and 80. These arms are pivoted as indicated in the drawings, and each arm is adapted to actuate a movable contact, the contacts being indicated at 81, 82, 83, and 84. The actuating levers 73—74 belong to one switching unit including the contacts 81/86 and 82/87, and the levers 75—76 are part of a switching unit including the contacts 83/89 and 84/90. These units are marked by dot-dash rectangles appearing in Fig. 5. The contact 81, which is operable by the arm 73 responsive to an actuation of the roller 77 by the control ring 40 may be weighted as indicated at 85 so as to bias the contact in clockwise direction. In other words, this contact is normally open with respect to the fixed contact point 86. The movable contact or switch arm 82 is normally closed with respect to the fixed contact point 87, due to the relative weight of the arm 74 and roller 78 which biases this contact assembly in counterclockwise direction. The movable contact 83 is biased in clockwise direction by means of the weight 88 and is normally closed with respect to the fixed contact 89. The movable contact 84 is again biased in counterclockwise direction and therefore is normally open with respect to the fixed contact point 90.

A preferred embodiment of a contact switch in which these contacts or switching means are incorporated in a novel manner is shown in Figs. 6 to 9 which will be presently explained in detail.

I will now explain a cycle of operation, referring mainly to the diagrammatic showing of the system as illustrated in Fig. 5.

It is assumed, for the purpose of description, that the jig is empty and is to be started up for operation. The supply gate, if such gate is provided, is open so that the material can flow through the chute 11 (Figs. 1 and 2) into the feed box 12. It is further assumed that the bed compartment 13 is initially completely empty. The float body 33 therefore has dropped practically to the bottom of the perforated bed plate 14 and is in the position shown in Fig. 5. The contacts 81/86, 82/87, 83/89 and 84/90 are also in the position indicated in Fig. 5. It is also assumed that the lever arm 62 is in the position shown; that is, the stops 65 and 66 are in engagement. It should be recalled at this point that the adjustable stop 66 provides for a desired normal adjustment of the shield 60. It is thus possible to determine by how many teeth the pawl 29 should normally advance the ratchet 28.

The switch 100 may be a manually operable device which is closed upon starting the machine so as to connect the current supply from the terminals 101 and 102 of a suitable current source. The float 33, shown in this embodiment, has been assumed to be in the lowermost position (the bed compartment being empty) and the control ring 40 has therefore depressed the roller 77, and with it the switch arm 73, holding the contacts 81—86 closed. These contacts are open during the normal operation of the device due to the biasing of switch arm 81. Due to this condition at the time of closing the switch 100, a circuit is completed for the energization of the solenoid 67 which may be traced from the terminal 101 over the upper arm of switch 100, conductor 103, contacts 86—81, contacts 87—82, conductor 104, winding of the solenoid 67, conductor 105, and back to the current source by way of the lower arm of switch 100 to the terminal 102. Solenoid 67 therefore energizes immediately upon closing the switch 100, attracts its plunger 68 and lifts the pawl 29, so that the pawl cannot engage any of the teeth of the ratchet 28 when it is moved by the rocking of double-armed crank 34. It is understood, of course, that the eccentric drive 31 is also actuated upon starting the machine. The removal of the pawl 29 to prevent advance of the ratchet 28, and consequently to prevent the operation of the rejection wheel, is in accordance with the invention because the material must first build up in the bed compartment 13 before the removal thereof can be started. The plunger or piston 20 of the jig cell shown in Figs. 1 and 2 is also actuated by means of the eccentric drive 21, and the column of water is advanced in pulsations, with the actuation of the plunger, against the perforated bed plate 14 and through the material which gradually accumulates in the bed compartment 13. The float 33 responds to these pulsations and therefore moves up and down, actuating the contact arm 73 by means of the control ring 40. Accordingly, the contacts 81/86 are opened and closed several times per minute during the initial operation of the apparatus, while the bed material gradually stratifies and builds up in the bed compartment 13. The non-operative position of the pawl 29 must be maintained during this initial phase of the operation. A holding circuit including the contacts 106—107 takes care of this function, the contacts being closed by an extension on the plunger 68 of the solenoid 67 upon energization of the solenoid. A holding circuit is thus provided from the conductor 103, over the conductor 108, contacts 106—107, conductor 109, directly to the contacts 87/82, and to the solenoid by way of conductor 104, as previously traced. The stratified material in the bed compartment gradually builds up and attains the level indicated in Fig. 5 by the dot-dash line 410.

At this moment the control rings 40—41 are in a correspondingly higher position, having been lifted with the float 33, and the control ring 41 moves the switch arm 74 and with it the contact 82 in clockwise direction, opening the circuit to the solenoid 67 which extends over the conductor 104. The contacts 81/86 are now in the normally open position since the control ring 40 is removed from engagement with the roller 77 on the arm 73. Accordingly, the solenoid 67 de-energizes upon opening of the holding circuit at the contacts 82/87 and drops the pawl 29 into the operating position shown in the drawings, at the same time opening the holding circuit at its own contacts 106—107. The ratchet wheel 28 will now be advanced in clockwise direction responsive to the angular oscillations or rocking of the crank 30/34 which is operated by the eccentric drive 31, and rotates the rejection wheel 24. The bed material which is to be rejected is now advanced from the chute 23 and is discharged into the elevator compartment 25, as previously described.

If the rate of stratification and accumulation of material in the bed compartment continues normally, that is, if the level 110 indicated in Fig. 5 is substantially maintained within the material compartment 13, the removal and discharge of the material to be rejected will also be maintained at this normal predetermined rate. The ratchet 28 will be advanced by a minimum number of steps determined by the setting of the shield 61, and the operation will be continuous and will deliver a uniform product. The holding of the top level of the heavier strata of material at this point of the operation maintains a seal over the rejection orifice which prevents loss of the lighter material through the chute 23.

If it is assumed now that the stratification and accumulation of the material in the bed compartment 13 progresses faster than its removal and discharge by the normal actuation of the rejection wheel 24, it is clear that the float 33 will also rise, riding always on top of the layer of material to be rejected. Therefore, the compensating mechanism, causing an acceleration of the removal, to take care of the accelerated rate of stratification, will come into operation. The float stem 37 rises with the float 33. In the course of its upward travel, which is a reciprocating upward displacement due to the pulsations of the water column, the float will displace the control rings 42 and 43 with respect to the switch arms 75 and 76. At a certain juncture of the upward travel of the float, the control ring 42 engages the roller 79 and tends to move the switch arms 75 and 83 in clockwise direction. This will have no effect on the operation of the mechanism; the contact spring 83 shown in the schematic representation of the system may be made of flexible material and will simply yield and press against the fixed contact 89.

Assuming that the accumulation of stratified material proceeds further and finally reaches the level indicated in Fig. 5 by dot-dash line 111, the control ring 43 will engage the roller 80 and will move the switch arm 76, and with it the contact 84, in clockwise direction, closing the circuit for the energization of the solenoid 70. This circuit may be traced from the terminal 101 of the contact source, upper switch arm 100, conductor 112, closed contacts 89—83, contacts 90—84 (which are closed by the actuation of control ring 43), conductor 113, winding of the solenoid 70, and from there over the lower arm of switch 100 to the terminal 102 of the current source. The solenoid 70 operates, attracts its plunger 71, and lifts the lever 62 by means of the flexible coupling 72 so as to rock or rotate the lever 61, and with it the shield 60 in counterclockwise direction, to remove the shield from cooperation with the pawl 29. The pawl can now engage the maximum number of teeth and can advance the ratchet 28 to rotate the rejection wheel 24 at a faster rate so as to compensate for the accelerated accumulation of material in the bed compartment by accelerated removal into and discharge through the elevator compartment 25. The solenoid 70, by attracting its plunger 71, closes its contacts 114 and 115, thereby closing its holding circuit over conductor 116, to prevent premature de-energization of the solenoid due to repeated opening of contacts 90—84 responsive to the motion of the float, as the result of the pulsations of the bed material.

This last described accelerated removal of the bed material continues so long as the condition of accelerated accumulation and stratification exists in the bed compartment.

If it is assumed now that the accelerated removal of material to be rejected reduces the mass of material in the bed compartment sufficiently to return to normal operation, the float will again drop to a medium position close to the level 110 shown in Fig. 5. At that time the control ring 42 will be positioned above the roller 79 and will engage this roller in the course of its downward travel and thereby move the switch arm 75 and with it the contact 83, in counterclockwise direction, opening the circuit at fixed contact 89, thereby interrupting the current flow for the solenoid 70 over its holding contacts (contacts 84—90 being open at this moment). The solenoid 70 de-energizes and drops the arm 62 into its resting position, thereby moving arm 61 and the shield 60 in clockwise direction into the normal position. The pawl 29 will then engage only a predetermined minimum number of teeth and correspondingly advance the ratchet 28 and with it the rejection wheel 24 at a lower rate of speed, which corresponds to the normal rate of operation when the stratification is such as to maintain the float substantially at the level 110.

If the rate of stratification decreases under the normal desired and predetermined rate, the float 33 will drop and the control ring 40, which is positioned on the float stem at a proper point, will actuate the switch arm 73 and with it the contact 81 in counterclockwise direction, to close the circuit for the energization of the solenoid 67. The pawl 29 will then be lifted again, and the removal of material will stop until the proper level is restored within the bed compartment.

The combination of electrical and mechanical controls described in the foregoing thus takes care of the following operations:

*First.*—The actuation of the rejection wheel (or gate) is initially inhibited in order to allow for proper stratification and accumulation of material in the bed compartment to a normal, predetermined level.

*Second.*—The actuation of the rejection wheel (gate or the like) is started when the normal predetermined level of material is reached within the bed compartment, and is maintained so long as the stratification proceeds at a substantially normal predetermined rate. If the rate of stratification drops below a certain point, the rejection wheel will be stopped.

*Third.*—An increase or decrease in the rate of stratification, that is, in the massing of material in the bed compartment beyond a certain amount, is compensated for by correspondingly increasing or decreasing the speed of operation of the rejection wheel (or rate of opening and closing of a rejection gate if such gate is provided in place of the wheel).

*Fourth.*—An unusual acceleration of stratification or massing of material in the bed compartment may be compensated for by an automatic actuation of a gate provided in the supply line of the apparatus.

The control rings 40 to 43, inclusive, can be adjusted on the float stem in any desired positions so as to take care of and to execute the switching operations at any predetermined or desired points or levels of the critical strata of material within the bed compartment. It is understood, therefore, that the levels 110 and 111 are indicated in their respective places in the drawing Fig. 5 only for explanatory purposes.

A preferred embodiment of a switching device which may be used to cooperate with the control rings on the float stem is indicated in Figs. 6, 7 and 8. This switch comprises two arms or levers 73' and 74' which are pivoted on a common shaft and carry rollers, such as 77' and 78' for cooperation with a pair of control rings, such as 40 and 41. The device shown in Figs. 6 to 8, inclusive, represents a switching unit which is adapted to take the place of the actuating means for the movable contacts 81 and 82 shown in Fig. 5. This unit is described below in detail. It is understood that a like unit may be used with simple appropriate adjustments which are apparent from Fig. 5, for cooperation with the pair of control rings 42—43.

A base or mounting plate 120, having a bracket extension 121 and the sides 122—123, carries a shaft 124 which is attached thereto by means of lock nuts 125. The levers 73' and 74' are rotatably journalled on the shaft 124, lever 73' being held in place by the spacer 131 and the hub 126, and lever 74' being similarly secured by means of the spacer 130 and the hub member 127. Numerals 128 and 129 designate lock nuts securing the assemblies of the rotatable lever arms 73' and 74' in place. The lever arm 73' carries a roller 77' which is held freely rotatable thereon by means of the nut and bolt members 132 and 133, and a similar roller 78' is mounted freely rotatable on the other lever arm 74' by means of the members 134 and 135. The lever arm 74' also carries a counterweight 136, as shown in the drawings. Each of the levers 73' and 74' may be made of an angle member, as indicated in Figs. 7 and 8, and each may carry a terminal block, such as 139 and 143, respectively. Attached to the terminal block 139 is the contact spring 82' and a similar contact spring 81' is secured to the terminal block 143. The terminals 140 and 144 are provided for the attachment of the corresponding conductors required for the electrical circuit. The contacts 82' and 81' are the movable contacts of this switching unit.

Fixed or stationary contacts for cooperation with these movable contacts are shown in Figs. 7 and 8 at 87' and 86', respectively, the first being carried on a fixed terminal block 137 and the latter being secured on the terminal block 141. The corresponding circuit conductors may be attached to the terminals 138 and 142, respectively, which are also provided on these fixed blocks.

The contact comprising the members 82' and 87' is normally closed, and the contact comprising the members 81' and 86' is normally open, which corresponds to the features of the similarly numbered but unprimed contacts shown schematically in Fig. 5. Limit stops 145—146 and 147—148 define the extent of angular motion of the contact actuating arms 74' and 73', respectively.

The above described switching device which includes the basic features also appearing in the structure diagrammatically shown in Fig. 5, furnishes distinct advantages. Among these may be mentioned the exceedingly simple structure with a pair of contact making devices mounted on a common shaft, and the angular placement of the individual switch arms 73' and 74' which provides for a large space and a more efficient plane of operation for the control rings, such as 40—41 shown in Fig. 5. These control rings can be more conveniently spaced and adjusted on the float stem with this switching device than would be the case with a device such as indicated in Fig. 5, wherein all of the contact actuating levers extend from the mounting plate in the same angular direction.

Fig. 9 shows the switching device of Figs. 6, 7 and 8 diagrammatically alongside the previously described device, with the float and the control rings on the float stem in normal operating position, that is, when the float rides on the top level 110 of the heavy material stratified on the perforated bed plate 14. Primed numerals designate details conforming to the functions of unprimed corresponding parts in Fig. 5.

During normal operation with the top level of the material to be rejected held at a predetermined point, the float will respond to the stratifying impulses and the pair of control rings 40—41 will reciprocate substantially within the space between the rollers 77' and 78'. Contacts 81' and 86' are open. The solenoid 67 is deenergized and the normal continuous process of feed, stratification and removal of material is in progress. If the stratification should lag behind the removal of the material the control ring 40 will contact roller 77' and tilt the arm 73' to close contacts 81'—86' (corresponding to contacts 81—86 in Fig. 5) so as to close the circuit for solenoid 67. The solenoid, upon energizing, removes the pawl 29 from engagement with the ratchet 28, as previously described, and thereby stops the rejection wheel and the removal of material, so as to furnish a time interval for stratification without removal during which the material accumulates on the bed compartment to a level where removal can again proceed. When this predetermined level is reached, the control ring 41 will contact roller 78' and tilt the arm 74' so as to open contacts 82'—87' to interrupt the holding circuit of the solenoid for the purpose of resuming the rotation of the rejection wheel and thus proceeding with the removal of the bed material, all as previously explained in detail in connection with the diagrammatic representation of the system as illustrated in Fig. 5.

The action of the apparatus when the jig is empty, with the float body dropped to its lowest position on the screen 14 is likewise similar to the operation previously described, except that the cooperation of the control rings with the contact rollers differs due to the more efficient plane of operation provided by the preferred embodiment of the switching device. The float and the control rings will then be below normal position, and the rings 41 and 43 may contact the rollers 77' and 79', respectively, instead of cooperating with the rollers 78' and 80', respectively, as they should during normal operation. When the float is in this lowered position, the cicuit for the solenoid 67 is closed at contacts 81' and 86' and the rejection mechanism is made inoperative by the removal of pawl 29 from engagement with the ratchet wheel 28. The continued actuation of the contacts 81' and 86' incident to the reciprocating or pulsing motion of the float and the control rings does not affect the energized solenoid 67 due to the interlocking holding circuit previously described. The coincident actuation of the roller 79' by the reciprocating control rings 42—43 is likewise without effect, during the pulsing motion of the float in its lowermost position, because the energizing circuit for the accelerating solenoid 70 can only be closed by an actuation of the roller 80' and consequent tilting of the switch arm 76', and such actuation can only take place at a time when the float is at a level above normal and not when it is in its lowest position.

Additional control means for governing the actuation of the supply gate can, of course, also be used in connection with the above explained embodiment of the invention using the specific switching device shown in Figs. 6 to 9.

The functions outlined previously at the conclusion of the description of the system as diagrammatically represented in Fig. 5 are thus fully preserved and achieved in an embodiment such as explained in the preceding paragraphs.

All functions are adjustable due, for example, to the adjusability of the float as such (exchange of float bodies); adjustability of the weight of the float (removable weights in the float stem insert); adjustability of the normal rate of advance of the rejection means, which may be a wheel or gate or the like (normal setting of the shield 60); and adjustability of the rate of lift of the shield (variable setting of the flexible coupling 72 with respect to the arm 62). Similar adjustable features may be provided in connection with the control for the supply gate.

Changes may be made if desired, without departing from the scope and spirit of the invention as defined in the accompanying claims wherein I have defined what is considered new and desired to have protected by Letters Patent of the United States.

I claim as my invention:

1. A control device for governing the level of a fluid medium comprising a float disposed in said medium, means for suspending said float in said medium including a stem and laterally arranged rollers for holding said stem so that it is axially and angularly freely movable, circular actuating members on said stem, a plurality of pairs of lever arms arranged one above the other in parallel with the axis of said stem, actuating bodies one on each of said lever arms disposed in a single plane parallel to the axis of said stem for successive operative engagement with said actuating members responsive to movement of said float and said stem in either axial direction thereof, control contact means governed by each of said lever arms, an electromagnet controlled by the contact means governed by each pair of successively operated lever arms, and separate associated contact means for controlling each electromagnet during the interval between the actuation of the lever arms controlling its associated contact means.

2. The control device is specified in claim 1, together with means governed by said electromagnets for controlling the removal of said fluid medium.

3. The control device specified in claim 1, together with a valve for controlling the discharge of said fluid medium, and means controlled by said electromagnets for controlling said valve.

4. In a separator having a chamber for separating comminuted materials according to the specific gravities of the particles thereof and a rotary ratchet operated valve for discharging material from said chamber, a device for automatically controlling the actuation of said valve, said device comprising a float disposed in said chamber, a stem for said float projecting vertically out of said chamber, means for mounting said stem so that it is axially and angularly freely movable, ring-like actuating members on said stem, a plurality of rotatably mounted lever arms disposed one above the other with their ends in a common plane paralleling the axis of said stem for engagement with said ring-like actuating members responsive to the displacement of said float, contact means controlled by said lever arms, a solenoid governed by said contact means, a pawl for rotating said ratchet and a drive for constantly reciprocating said pawl while the separator is in operation, and a link for directly mechanically coupling the plunger of said solenoid with said pawl to dispose the pawl with respect to the ratchet in accordance with the displacement of said float.

5. The structure and combination defined in claim 4, together with means for adjusting the weight of the float.

6. The structure and combination defined in claim 4, wherein said ring-like members are adjustably mounted on said float stem to predetermine the operative relation thereof with said rotatably mounted lever arms.

7. The structure and combination defined in claim 4, together with means for adjusting the effective operative throw of said pawl, a second solenoid governed by said contact means, and a link for directly mechanically coupling the plunger of said second solenoid with said last named means to adjust the same in accordance with the displacement of said float.

8. In a separator having a chamber for receiving material for separation and having a pawl and ratchet operated rotary discharge valve for discharging separated material, means for normally constantly reciprocating the pawl at a substantially constant rate while the separator is in operation tending to operate said valve through the medium of the ratchet so as to discharge material at a predetermined substantially constant rate, adjusting means for varying the position of said pawl relative to said ratchet so as to control its operatively effective engagement with the teeth of said ratchet, electromagnetic means and a circuit therefor for controlling the operation of said adjusting means, movable trip means controlled by a float disposed in said chamber, switch contact means directly operable by said trip means responsive to movement thereof in a predetermined direction for directly controlling the circuit of said electromagnetic means, a holding contact interposed in the circuit of said electromagnetic means for maintaining the circuit thereof, means directly operable by said electromagnetic means for actuating said holding contact, and means responsive to movement of said trip means in reverse direction for opening the circuit maintained over said holding contact.

HARRY W. BRENTZ.